United States Patent [19]

Foley

[11] 4,060,722
[45] Nov. 29, 1977

[54] FIBRE OPTICS DISPLAY

[76] Inventor: Robert A. Foley, 75 Rollins Ave., Bellville, Ontario, Canada

[21] Appl. No.: 721,348

[22] Filed: Sept. 8, 1976

[51] Int. Cl.² .................. A47G 33/16; F21P 1/02
[52] U.S. Cl. ................................ 362/32; 362/123
[58] Field of Search ............... 240/1 LP, 10 T, 10 R, 240/10.1, 10 L, 10 P, 10 Q; 350/96 R

[56] References Cited

U.S. PATENT DOCUMENTS

| | | | |
|---|---|---|---|
| 2,125,907 | 8/1938 | Frei | 240/10 L |
| 2,227,861 | 1/1941 | Petrone | 240/10.1 |
| 3,431,410 | 3/1969 | Dolan et al. | 240/1 LP |
| 3,465,139 | 9/1969 | Siegal | 240/10 L |
| 3,766,376 | 10/1973 | Sadacca | 40/10.1 X |

*Primary Examiner*—Richard L. Moses
*Attorney, Agent, or Firm*—Robert D. Farkas

[57] ABSTRACT

A fibre optic display fashioned to illuminate an artificial Christmas tree utilizing a plurality of fibre optic filaments fashioned into a main bundle within the trunk portion of the Christmas tree. The base of the tree is supported by an illuminating base structure. A color wheel housed within the illuminating base structure is rotated by the heat obtained from a light source similarly housed within the base structure, interjecting various colors of light into the free end of the fibre optic bundle. The bundle is divided into branch bundles, wherein each branch bundle is secured to the trunk portion of the tree at the point adjacent the opening through which the branch bundle emerges from the interior of the trunk. The branch bundles run along the individual branches of the tree by being secured to the outside surface of the individual branches or by being confined within a hollow causeway within the individual branches. In the latter case, the individual filaments emerge through small openings along the length of the branch and in the former case, the free ends of the individual filaments are disposed individually along the length of the branch. The light is intermittenly interrupted creating a "twinkling" effect. The fibre optic system forms an integral part of the artificial Christmas tree having only the illumination source - tree supporting base structure removably fastened at the base of the tree trunk. The illuminated free ends of the individual filaments may be provided with light reflectors or diffusers.

6 Claims, 5 Drawing Figures

FIBRE OPTICS DISPLAY

BACKGROUND OF THE INVENTION

1. Field of the Invention

This invention relates to fibre optic illumination systems and more particularly to that class utilized to provide decorative structures.

2. Description of the Prior Art

The prior art abounds with a variety of fibre optic systems utilizing bundles of fibre optics to create a variety of decorative effects. U.S. Pat. No. 3,564,233 issued to M. C. Cox on Feb. 16, 1971 illustrates a fibre optic system utilized to illuminate an ornamental Christmas tree employing a light source remotely located from the base of the tree coupled to a fibre optics harness thereof. A color wheel at the light source controls the apparent colors induced into each fibre optic element which in turn is illuminated by ornamental shapes at the free end of the optic system. U.S. Pat. No. 3,641,335 issued to L. J. Wall on Feb. 8, 1972 teaches a fibre optics system which also is utilized to simulate a Christmas tree and employs triangular lateral surfaces to support the elements of the fibre optic system in strong wind or air current areas.

Neither disclosure illustrates an effective way to store the delicate fibre optic system when it is not illuminated by the illumination source.

SUMMARY OF THE INVENTION

A primary object of the instant invention is to provide a fibre optic system illuminating an artificial Christmas tree which can be protected by storing the delicate filaments thereof along hollow passageways within the tree.

Another object is to provide an illumination device which serves the dual purpose of providing vertical support for the Christmas tree and providing illumination for the fibre optic filaments contained therewithin.

Yet another object is to provide a means for storing the fibre optic elements thereof into the base of an illuminating structure.

A further object is to provide a means to insert the fibre optic elements into the base of the illuminating structure without fear that the fibre optic elements will be damaged.

Another object is to provide a fibre optic system in which the individual fibre optic elements produce a variety of colors as determined by a heat convention rotating disc interposed the bundled ends of the elements and the light source.

Still another object is to provide a fibre optic system simulating a Christmas tree in which the elements will alternately be illuminated in a variety of colors and cease to transmit light all together creating thereby a "twinkling" effect simulating the effect that a Christmas tree would display utilizing conventional lights.

Christmas trees are a very popular item in the American culture and have been to a great extent exploited in the commercial sense by light sources that are applied to either natural or artificial trees. These light sources often are made to turn on and off intermittently and usually are of the type that have a fixed color. Displaying them around the tips of each branch creates a pleasing and decorative effect.

Fibre optics possess the qualities of transmitting light along the length of the elements thereof and can be utilized to simulate the lighting effect of a conventional Christmas tree lamp at the branch end formed by the fibre optic system if so utilized.

The instant invention is utilized with an artificial Christmas tree having a hollow trunk portion. The branches of the tree are hingably affixed to the trunk so that the branches may be pivoted upwardly facilitating storage of the collapsed tree assembly into a hollow container. Orifices are provided adjacent the point at which each individual branch is pivotably affixed to the trunk. A plurality of fibre optic filaments are bundled together to form a main bundle assembly adjacent the free ends of each filament closely located to one another. This main termination of the fibre optic system is located within the tree trunk adjacent the base portion thereof. Subgroupings, or sub-bundles, of fibre optic filaments, pass through the orifices. A clamping apparatus secures the sub-bundle to the wall of the trunk of the tree at the orifice through which the sub-bundle passes. In one embodiment of the present invention, the sub-bundle is disposed along the exterior surface of its supporting branch, having the individual filaments thereof distributed along the length of the branch. The free ends of each filament are permitted to extend outwardly from the exterior surface of the branch supporting it. In an alternate embodiment, the sub-bundle, after leaving the clamping device, enters a hollow passageway in a branch. Individual filament orifices are disposed along the length of the branch and are utilized to permit the individual filaments to be merged from within the passageway within the branch. In either embodiment, the artificial Christmas tree may be folded up and stored within its container or disposed in an extended erected operating position without exposing the bulk of the fibre optic filament system to the risk of accidental damage due to mishandling or the like.

The artificial Christmas tree is maintained in a vertical position when the base of the trunk thereof engages an opening in a collar extending upwardly from a supporting base structure. The supporting base structure houses an illuminating source comprising an incandescent lamp.

Interposed between the illuminating source and the base end of the fibre optic system is a wheel whose axis of rotation is parallel and coincident with the longitudinal axis of the tube. This wheel contains a plurality of holes or openings which are covered with a variety of colored transparent elements. The wheel additionally has veins such that the heat of the illuminating source tends to rotate the wheel, forcing each of the colored elements to alternatively provide colored lights to each of the fibre optic element ends closest thereto. When the wheel is in the position in which there is no opening interposed between the light source and a fibre optic element, that fibre optic element is darkened and will not transmit light. A short time period thereafter the wheel will move to a position in which a colored element will be interposed between the illuminating source and the fibre optic element at which time that particular element will reflect light of the same color as the colored element interposed therebetween.

The free end of each fibre optic element extending outwardly from the branches supporting them may be adapted with a light reflecting or light diffusing element which creates a pleasing illuminated effect.

These objects, as well as other objects of this invention will become more readily apparent after reading the following description of the accompanying drawings.

DESCRIPTION OF THE PREFERRED EMBODIMENT

Figure 1:
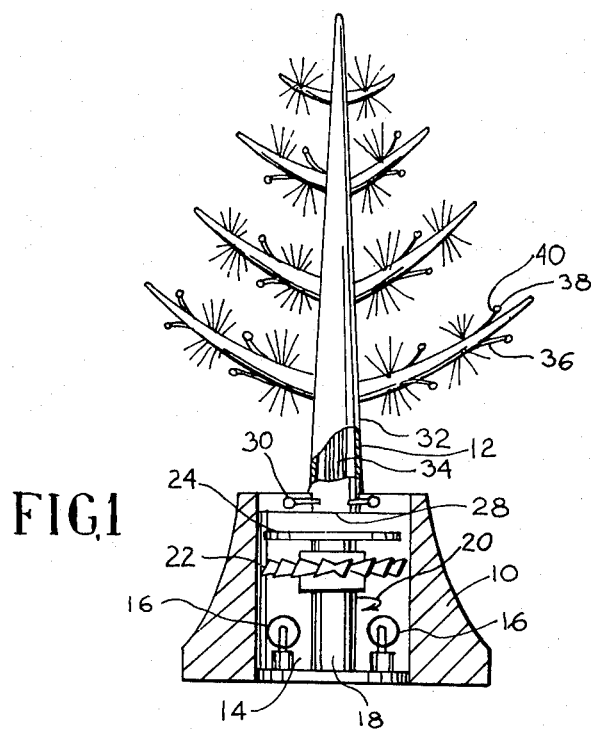
FIG. 1 is a front elevation view of an artificial Christmas tree carrying a fibre optic display system, shown supported vertically by a supporting base and illuminating apparatus.

The structure and method of fabrication of the present invention is applicable to a plurality of fibre optic filaments arranged so as to have one end of each filament disposed in aligned relationship. A portion of the length of each of the filaments adjacent to the aligned ends is housed within the hollow portion of the interior of an artificial Christmas tree. The aligned ends adjacent the main bundle of the plurality of filaments is disposed near the mouth of the passageway within the trunk of the tree adjacent the base of the trunk of the tree. The main bundle is divided up into sub-bundles each passing through an orifice disposed at the root of the individual tree branches. The individual sub-bundles are clamped, utilizing a conventional clamping device, to the trunk of the tree so as to limit any motion of the sub-bundles. Each of the sub-bundles proceed along the length of an adjacent tree branch by either being carried along the exterior surface thereof or by passing through a passageway disposed along the length thereof. In the latter case, small orifices in the tree branch permit the individual filaments to emerge from the confines of the tree branch passageway. The free ends of the individual filaments may have a relfector affixed thereto. One such reflector consists of a solid sphere of transparent or colored plastic having an elongated opening therein in which the otherwise free end of the filament is secured. Each branch of the tree is hingably secured to the tree so as to facilitate pivoting the branch toward the top of the tree into a storage position. The clamping device prevents any motion being imparted to the sub-bundle as its associated branch is pivoted into and out of a storage position. When all the branches are folded upwardly, the unerected tree may be stored within a hollow tube-like container providing protection to each of the free ends of the filaments. All the remaining portions of the fibre optic filaments are protected from damage by virtue of either being stored entirely within the Christmas tree or partially stored within the tree with the remaining portions being protected by running parallel to the tree branches.

The illuminating source — Christmas tree base supporting structure comprises a hollow housing having a cylindrical tube extending upwardly from the upper regions thereof. The base of the Christmas tree is adapted to fit within the cylindrical tube thereby providing vertical support to the tree trunk. An incandescent lamp, powered by household utility voltage, illuminates the interior of the housing and provides illumination to one end of the cylindrical hollow tubing by way of a port opening in the housing adjacent the point at which the hollow tubing is affixed to it. Thus, light rays enter the mouth portion of the hollow passageway in the base of the trunk of the Christmas tree and illuminate the aligned ends of the main branch of the fibre optic filaments. A fan-like blade and a circular plate are secured to a common shaft journaled within the housing so that the shaft may rotate about its vertically disposed axis. The circular plate is adapted with a plurality of holes, some of which are covered with translucent diversely colored plastic films. The heat from the incandescent lamp causes the fan-like blade to rotate about its shaft, in turn causing the circular plate to interpose the holes therein sequentially between the incandescent lamp and the port opening in the housing. Thus, the illumination reaching the aligned ends of the fibre optic filaments varies in color and intensity creating a pleasing "twinkling" effect at the free ends of the fibre optic filaments located along the branches of the tree.

Now referring to the figures, and more particularly to the embodiment illustrated in FIG. 1 showing the illuminating source and Christmas tree base supporting structure 10 having a cylindrical hollow tube 12 affixed thereto. Compartment 14 houses incandescent lamps 16. Shaft 18 is journaled within compartment 14 and is free to rotate in the direction of arrow 20 when the heat from lamps 16 cause fan-like blades 22 to rotate. In so doing, circular plate 24 is also caused to rotate. Opening 26, in plate 24, passes below hollow tube 12 and permits the light emitted from lamps 16 to enter port 28 and thence into the interior of hollow tube 12. Thumb screws 30 secure tree trunk 32 within hollow tube 12. Fibre optic main bundle 34 is shown housed within tree trunk 32 having the aligned ends of each of the filaments thereof exposed to the illumination eminating from incandescent lamps 16. Fibre optic filaments 36 terminate at free ends 38 thereof, each bearing if desired, a reflecting element 40.

Figure 2:
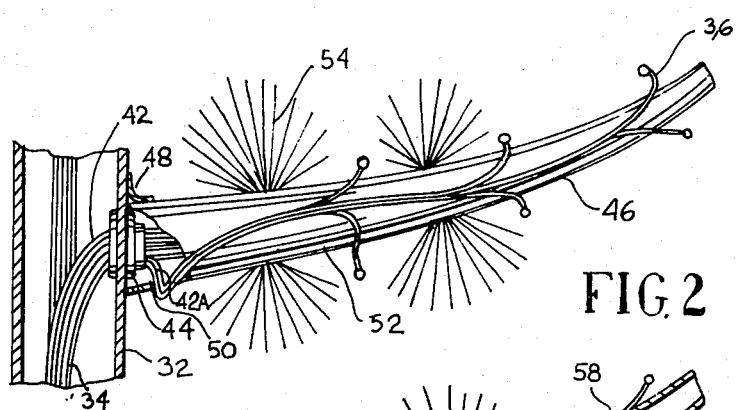
FIG. 2 is a front elevation view of a portion of the trunk of the Christmas tree, shown in FIG. 1 and a branch thereof carrying a sub-bundle of fibre optic filaments on its surface.

FIG. 2 shows a cutaway view of tree trunk 32 shown housing main bundle 34. Sub-bundle 42, comprising a sub-plurality of fibre optic elements of main bundle 34, passes through a clamping device 44 of conventional design, disposed within an orifice in tree trunk 32. Tree branch 46 is pivotably secured to tree trunk 32 utilizing pivoting strap 48 therefor. Sub-bundle 42a passes through notch 50 disposed at the base of branch 46. The sub-bundle 42a is secured to the surface 52 of branch 46 in such a fashion so as to permit individual filaments 36 to extend outwardly from branch 46 at selected locations. Imitation pine needles 54 simulate the needles on a pine tree.

Figure 3:
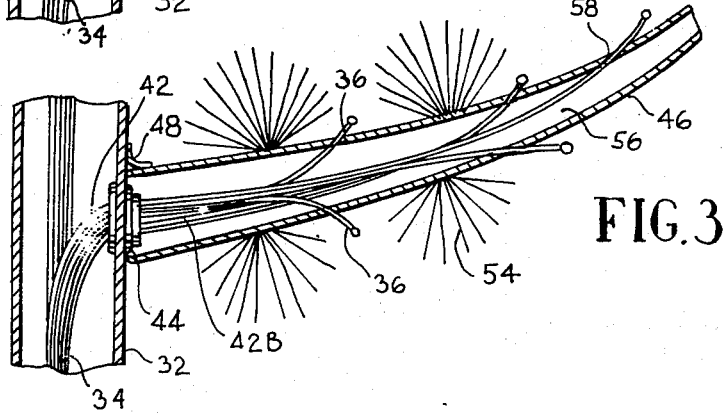
FIG. 3 is a front elevation view of a portion of the trunk of the Christmas tree, shown in FIG. 1, and a branch thereof carrying a sub-bundle of fibre optic filaments extending within the hollow interior of the branch and outwardly therefrom.

FIG. 3 illustrates a cutaway view of branch 46 wherein sub-bundle 42b is contained within the confines of passageway 56 extending substantially along the length of branch 46. Small openings 58 permit individual fibres 36 to emerge from passageway 56.

Figure 4:
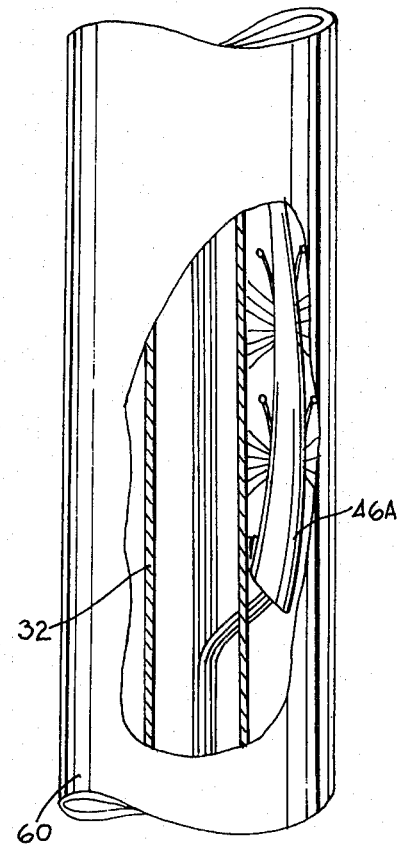
FIG. 4 is a perspective view of a portion of the trunk of the Christmas tree having a branch thereof folded into a storage position, all disposed within a storage container.

FIG. 4 shows protective container 60 shown wrapped around tree trunk 32 and folded up branch 46a.

Figure 5:
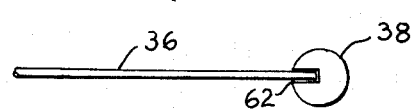
FIG. 5 is a side elevation view of the free end of a fibre optic filament carrying a light reflecting sphere.

FIG. 5 shows the individual optic fibre 36 secured at a free end thereof in an opening 62 of plastic solid sphere 38, serving as a light reflector.

One of the advantages is a fibre optic system illuminating an artificial Christmas tree which can be protected by storing the delicate filaments thereof along hollow passageways within the tree.

Another advantage is an illuminating device which serves the dual purpose of providing vertical support for the Christmas tree and providing illumination for the fibre optic filaments contained therewithin.

Yet another advantage is a means for storing the fibre optic elements thereof into the base of an illuminating structure.

A further advantage is a means to insert the fibre optic elements into the base of the illuminating structure without fear that the fibre optic elements will be damaged.

Another advantage is a fibre optic system in which the individual fibre optic elements produce a variety of colors as determined by a heat convection rotating disc interposed the bundled ends of the elements and the light source.

Still another advantage is a fibre optic system simulating a Christmas tree in which the elements will alternately be illuminated in a variety of colors and cease to transmit light altogether creating thereby a "twinkling" effect simulating the effect that a Christmas tree would display utilizing conventional lights.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

I claim:

1. In an artificial Christmas tree comprising a trunk portion, a plurality of branches hingably secured to the trunk portion, the trunk portion having a hollow passageway extending substantially along the length thereof, the improvement comprising:
   a. a plurality of fibre optic filaments having first ends of each closely positioned one another to form a light receiving termination thereof, the termination being disposed within the passageway adjacent the base of the trunk portion, the plurality of filaments forming a quantity of sub-pluralities of filaments, one of the sub-plurality of filaments comprising a bundle passing through an orifice communicating to the passageway and being disposed located adjacent each root of each branch, means to clamp each bundle at each orifice, the other ends of the plurality of filaments being disposed distributed along the length of the plurality of branches; and
   b. a tree trunk base supporting structure having a receptacle fixedly secured at the upper end thereof, the base of the trunk portion being removably secured within the receptacle, the receptacle disposing the trunk portion in substantially vertical alignment, the supporting structure comprising a housing, a lamp being disposed within the housing, the lamp being disposed producing rays of light communicating through a port in the housing to the light receiving termination of the plurality of filaments.

2. The improvement as claimed in claim 1 further comprising a shaft, the shaft being disposed journaled within the housing, the longitudinal axis of the shaft being disposed in substantial vertical alignment, a plurality of blades fixedly secured to the shaft and extending radially outwardly therefrom, a circular plate fixedly secured to the shaft extending radially outwardly therefrom, the plate having a plurality of openings therein disposed successively upon the rotation of the shaft disposed communicating the rays of light eminating from the lamp to the light receiving termination.

3. The improvement as claimed in claim 2 wherein at least one of the openings is covered by a color filter.

4. The improvement as claimed in claim 1 further comprising an interior passageway disposed along a portion of the length of one of the branches, the bundle adjacent thereto being disposed within the interior passageway, the filaments comprising the bundle passing through holes in the branch disposed along the length of the interior passageway.

5. The improvement as claimed in claim 1 further comprising the bundle being carried along the surface of a branch disposed adjacent the orifice through which the bundle passes.

6. The improvement as claimed in claim 1 further comprising a light reflector fixedly secured to each of the other ends of said plurality of filaments.

* * * * *